July 16, 1974  E. CARNALL, JR., ET AL  3,824,301
CADMIUM SULFIDE INFRARED TRANSMITTING OPTICAL ELEMENTS
Original Filed Sept. 28, 1961  2 Sheets-Sheet 1
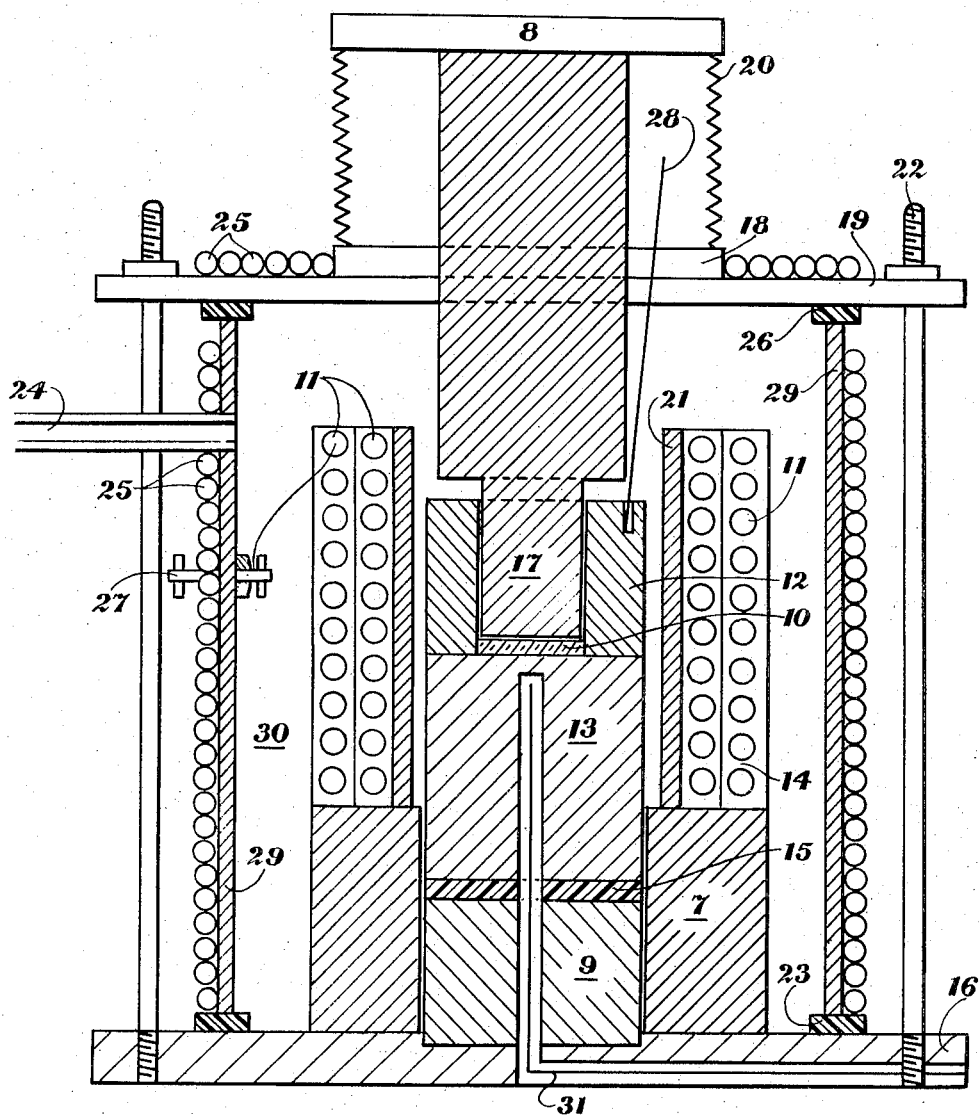
Edward Carnall, Jr.
William F. Parsons
INVENTORS
ATTORNEYS

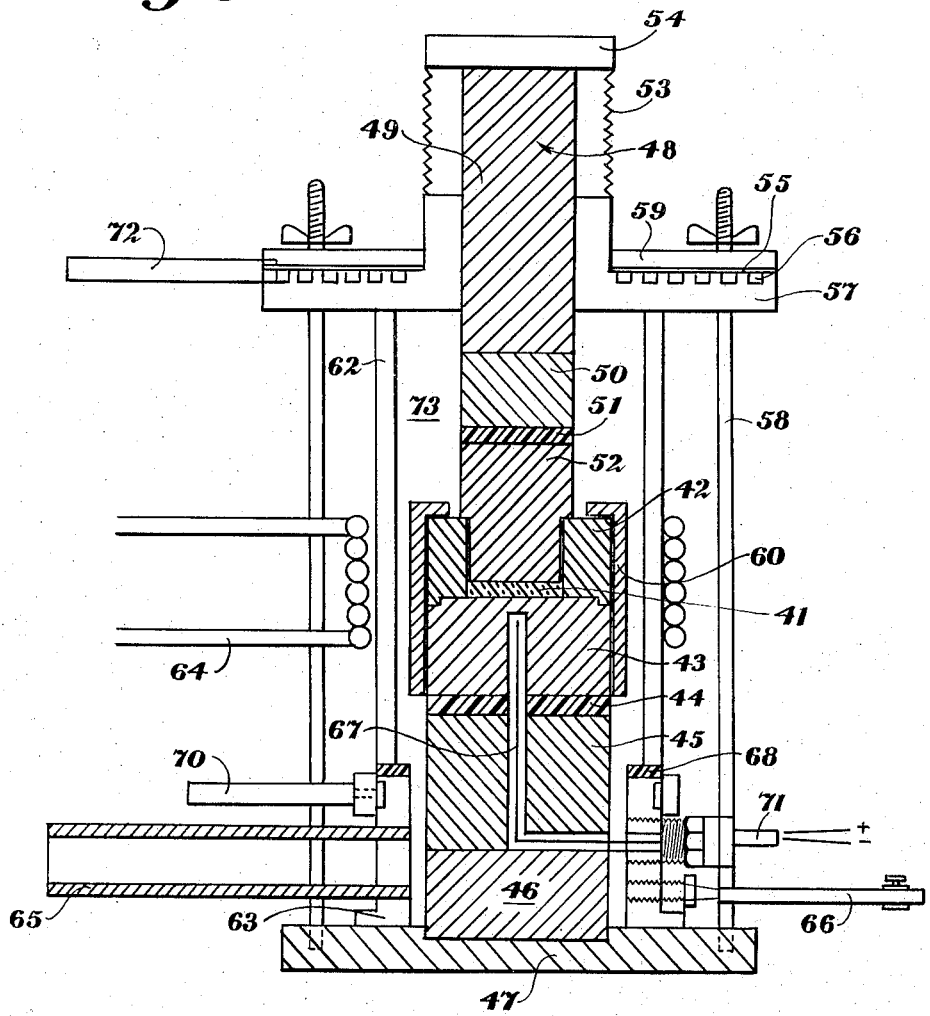

United States Patent Office 3,824,301
Patented July 16, 1974

3,824,301
CADMIUM SULFIDE INFRARED TRANSMITTING
OPTICAL ELEMENTS
Edward Carnall, Jr., and William F. Parsons, Rochester, N.Y., assignors to Eastman Kodak Company, Rochester, N.Y.
Continuation of abandoned application Ser. No. 141,426, Sept. 28, 1961. This application Nov. 30, 1970, Ser. No. 93,898
Int. Cl. C01g 11/02, 1/12
U.S. Cl. 423—561                           2 Claims

ABSTRACT OF THE DISCLOSURE

An article which transmits radiation in the infrared region of the electromagnetic spectra consisting of particles of cadmium sulfide joined by hot pressing powdered particles, said article being a unitary polycrystalline solid having substantially homogeneous crystalline areas and a density of at least 99% of theoretical density.

---

This is a continuation of application Ser. No. 141,426 filed Sept. 28, 1961, now abandoned.

This invention relates to optical elements and to methods for making optical elements. More particularly, this invention relates to methods for hot pressing transparent polycrystalline optical elements of various geometrical shapes under high pressures, temperatures and vacuum from cadmium sulfide powder. These elements may be employed as windows in missiles and projectiles and related devices requiring such infrared optics. These cadmium sulfide windows are also useful as substrates for optical filters. Cadmium sulfide windows produced by our process are very stable to shock and have desirable transmittance characteristics.

An object, therefore, of the present invention is to provide an article of manufacture consisting essentially of transparent polycrystalline cadmium sulfide.

Another object is to provide a homogeneous solid of molded cadmium sulfide having a density of from 99% up to and including the theoretical density.

Still another object is to provide a molded optical element which transmits in the red portion of the visible and in the infrared regions of the electromagnetic spectrum.

Another object is to provide an infrared transmitting element which will be suitable for use in missiles, projectiles, satellites and related devices.

Yet another object is to provide a method of molding cadmium sulfide to form such optical elements.

A further object is to provide novel molding apparatus suitable for hot pressing cadmium sulfide powder into a solid body.

In accordance with a feature of this invention, cadmium sulfide powder is hot pressed in a compression mold under condition of high pressure, high temperature and high vacuum or inert atmosphere into a solid molded unit of infrared transparent cadmium sulfide. The mold may be of any suitable shape to form a window or a lens of desired contour.

The invention will be further understood by reference to the following detailed description and drawings in which:

FIG. 1 is a view of an infrared transparent polycrystalline solid molded from cadmium sulfide powder;

FIG. 2, is an elevational view, partly in section, of a compression molding device for molding cadmium sulfide powder in accordance with this invention; and FIG. 3 is an elevational view, partly in section, of a compression molding device for molding cadmium sulfide powder into optical units which employs high frequency heating.

The molding apparatus shown in FIG. 2 comprises a base 16, a silicone gasket 23, a block 9, a thermal insulator 15, a block 13, a molding cylinder 12, a molding plunger 17, having a head 8 which is adapted to be attached to a prime mover, not shown, such as the piston of a hydraulic press to move the plunger 17 vertically into and out of molding cylinder 12 and thereby press the cadmium sulfide powder into the solid unit shown at 10.

The head 8 is attached to aligning ring 18 by metal bellows 20 thereby assuring a vacuum seal around the upper portion of the plunger 17.

A cylinder 21 encloses the molding cylinder 12 and lower portion of the plunger 17 and is supported on block 7. A heating unit 14 comprising a refractory casing is positioned around cylinder 21 and is also supported on block 7 and contains electric heating coils 11, the terminals for which are shown at 27.

A cylinder 29 is positioned concentrically in respect to cylinder 21 and forms a vacuum chamber 30, the ends of which are closed by gaskets 23 and 26 and plates 16 and 19. Cooling coils 25 are positioned in contact with the outer surface of cylinder 29. A conduit 24 connects the vacuum chamber 30 to a suitable vacuum system not shown. The assembly is further secured by the coaction of top plate 19 and threaded rods 22 and base plate 16.

The temperature is measured by either one or by both thermocouples 28 and 31 which are suitably located in channels respectively positioned adjacent the molding position.

The block 9 and cylinder 12 and plunger 17 may be made of molybdenum alloy, Nichrome, or stainless steel. These members must be inert toward cadmium sulfide.

A satisfactory hot pressed, infrared transparent polycrystalline cadmium sulfide window may be made employing the apparatus shown in FIG. 2 as follows:

Cadmium sulfide powder is introduced into the cavity of cylinder 12 beneath plunger 17. Chamber 30 is evacuated through pipe 24. Next cooling water is circulated through the cooling coils 25 and also through the plantens, not shown, of the hydraulic press, and then electric current is supplied to the heater coils 11 through terminals 27. The temperature of the mold is monitored by means of platinum-rhodium thermocouples 28 and 31. When the temperature of thermocouple 28 reaches 530° C., force is applied to the head 8 of plunger 17 by the hydraulic press, not shown, and the pressure is raised on the cadmium sulfide powder to approximately 40,000 p.s.i. This pressure is maintained on the cadmium sulfide for from 10 to 40 minutes while the temperature is held at 530° C. At the end of the pressing period, the powder is shut off and the pressure is released slowly. The vacuum pump is shut off and argon, or other inert gas, is bled into chamber 30. The assembly is allowed to cool to about 200° C. as recorded by the thermocouples.

The plunger 17 is now withdrawn from the cylinder 12 and the piece of polycrystalline transparent cadmium sulfide 10 is permitted to cool to approximately room temperature and is removed from the apparatus and employed as desired.

Referring to FIG. 3, an elevational view, partly in section, of another modification of the molding apparatus is shown. This modification employs high frequency heating. In general, however, the parts of the apparatus are similar in kind and operation to that shown in FIG. 2.

The pressed cadmium sulfide power is shown at 41. The apparatus comprises molding cylinder 42, molding block 43, insulator 44, and supporting blocks 45 and 46. Block 46 rests on base 47. A graphite sleeve 60 is positioned between induction heating coils 64 and members 42 and 43. Also positioned on base 47 is a cylindrical chamber 63 through which vacuum conduit 65, a vacuum release conduit 66 and a thermocouple conduit 71 extend. A water pipe 70 connects the chamber 63 to a water supply, not shown. The thermocouple is shown at 67. A quartz cylinder 62 is positioned on member 63 and separated therefrom by a gasket 68. Cylinders 62 and 63 thus form a vacuum chamber 73, the upper portion of which is closed by plate 57 having water cooling channels 56 therein. Cooling water is supplied through conduit 72 to channel 56. A gasket 55 forms the upper surface of the channels 56 and is held in position by clamping plate 59. The assembly is clamped by a plurality of clamping rods 58 and cooperating wing nuts.

The molding plunger 48 extends through an aligning aperture in plate 57. Freedom of motion of the plunger and a vacuum seal are achieved by means of the metal bellows 53, the ends of which are sealed respectively to the head 54 of the plunger 48 and to plate 57. The molding plunger assembly 48 comprises three sections; section 49 is preferably made of Nichrome or stainless steel; section 50 of Nichrome or stainless steel, and section 52 of molybdenum, molybdenum alloys, or super alloy. Thermal insulator 51 is positioned between sections 50 and 52. The various plunger sections are held together by threaded pins.

Top plates 57 and 59 and the base plate 47 may be of aluminum. Cylinder block 42, block 43 and plunger 52 preferably are of molybdenum, molybdenum alloys, or super alloy, block 45 of Nichrome and block 46 of stainless steel. The insulators 44 and 51 are of transite or of material of similar or superior thermal insulating properties which will withstand the high temperatures and pressures involved.

Since molybdenum does not couple the high-frequency field efficiently, a graphite sleeve 60, which fits snugly over the molding cylinder is employed. The high-frequency field couples and heats the graphite which in turn heats the molding cylinder by thermal conduction.

If a situation arises in which it is desirable to eliminate the graphite susceptor 60, it is preferable to make the plunger section 52, cylinder 42 and block 43 of a material which couples efficiently with the high-frequency field. Materials such as the high temperature nickel base alloys may be used.

The apparatus of FIG. 3 is operated at substantially the same schedule of temperature, pressure and vacuum as described above, but due to the high-frequency heating, the heating cycle can be considerably reduced.

The above-described hot pressing operations give optimum results. However, satisfactory transparent polycrystalline cadmium sulfide windows have been produced at temperatures varying from 510° C. to 800° C.

Pressures have been varied from about 10,000 p.s.i. to 55,000 p.s.i. Pressures less than 10,000 p.s.i. may result in a window that is not completely pressed to a homogeneous mass, or which has reduced transmittance. Any pressure in excess of the optimum 55,000 p.s.i. does not seet to contribute to the quality of the window.

The time at pressing temperature has been varied within the limits of about 10 to 40 minutes. At times less than 10 minutes, the window may not be pressed out.

Limits are imposed on hot pressing by the available mold materials. The plunger, molding cylinder and supporting block must all be strong at high temperatures. An alloy of molybdenum and titanium, suitable super alloys, or certain high temperature steels or nickel alloys may be used for pressing cadmium sulfide.

A problem in hot pressing cadmium sulfide has been purification of the compound from foreign materials. This can be accomplished during the hot-pressing cycle before pressure is applied by a vacuum bake. A further puurification can be incorporated before the powder is placed in the mold cylinder, if so desired. Powder of submicron crystal size and of high purity is most desirable for hot pressing.

A major problem in the hot-pressing work is the unwanted bonding between the cadmium sulfide and mold parts. Some cracking of cadmium sulfide windows has occurred because of bonding to the molybdenum mold parts. It has been found effective to cover the parts of the mold contacting the cadmium sulfide with a light coat of graphite. This prevents sticking and cracking. It may also be helpful to line the mold cavity with a thin foil of a material such as tungsten.

Cadmium sulfide windows may be sealed into metal rings to provide infrared transmitting windows hermetically sealed to the metal. The metal may be used as a mounting surface.

Since cadmium sulfide has a high index of refraction (about 2.4 at red end of the visible) it is a highly refracting material and might be made into lenses of great light-gathering power. Thus, it might be possible to coat lead sulfide or other infrared sensitive material on a cadmium sulfide lens to produce an infrared detector. The cadmium sulfide would increase the radiation density on the photodetector.

Properties of Hot-Pressed Cadmium Sulfide

The hot-pressed cadmium sulfide takes a good optical polish. It is deep red in color. The hot-pressed material passes some light in the red end of the visible range and has good transmission to about 16 microns before absorption occurs. Because of its high refractive index, there is appreciable loss of light by reflection, but this may be effectively reduced by applying an anti-reflective coating. The coating material will be an excellent infrared transmitter. Cadmium sulfide is substantially insoluble in water so that it performs satisfactorily in humidity tests.

Properties

| | |
|---|---|
| Color | Deep orange-red. |
| I.R. (infrared) transmission | To 16 microns. |
| Index of refraction | 2.33 at 1 micron. |
| Reflection loss | About 26%. |
| Hardness | Mohs 3–3.5. |
| Density | 4.82. |
| Coefficient of expansion | $4 \times 10^{-6}/°C$. |
| Solubility | Insol. |
| Workability, i.e. grinding and polishing. | Like glass. |
| Thermal conductivity | $3.8 \times 10^{-2}$ cal./cm.$^2$ sec. °C.) at 14° C. |

The theoretical density of the hot-pressed polycrystalline cadmium sulfide is measured as follows:

The density of cadmium sulfide was measured by the hydrostatic weighing method as described on page 104 in Chapter III on density in A. Weissberger's *Physical Methods of Organic Chemistry*, Vol. 1, Interscience Publishers, Inc., N.Y. (1945). This method is widely recognized as suitable for high precision density measurements of solids and is also described in Section 4.1.3.3 of Vol. 6, Part A of *Methods of Experimental Physics*, Academic Press, New York (1959).

Deviations from theoretical density are indicative of second phase inclusions in the pressing such as impurities or porosity.

It is claimed:

1. An article of manufacture consisting of a homogeneous unitary solid of polycrystalline cadmium sulfide hot pressed from submicron powder particles of high purity cadmium sulfide at a temperature of about 510° C. to 800 C. and a pressure of 10,000 to 55,000 pounds per square inch for at least 10 minutes while in an inert atmosphere, said article being red in color, having an index of refraction of 2.33 at 1 micron wavelength, a coefficient of expansion of $4 \times 10^{-6}/°C$., a specular transmission up to 16 microns in the infrared region of the electromagnetic spectrum, a density in the range of 99% up to and including theoretical density, a reflection loss of about 26%, and a hardness of 3–3.5 on the Mohs scale.

2. An article of manufacture according to claim 1 wherein the pressure is about 30,000 to 55,000 pounds per square inch.

References Cited

UNITED STATES PATENTS

| | | | |
|---|---|---|---|
| 2,947,613 | 8/1960 | Reynolds et al. | 23—294 |
| 3,131,025 | 4/1964 | Carnall, Jr., et al. | 423—561 |

OTHER REFERENCES

Remy, "Treatise on Inorganic Chemistry," Vol. II, 1956, pp. 423–425 and 448.

EDWARD STERN, Primary Examiner

U.S. Cl. X.R.

350—1; 264—1